(12) United States Patent
Breindl et al.

(10) Patent No.: US 6,837,924 B2
(45) Date of Patent: Jan. 4, 2005

(54) MODELING COMPOSITION AND ITS USE

(75) Inventors: Johann Breindl, Beilngries (DE); Heinrich Schnorrer, Schondorf (DE); Josef Eichhammer, Neumarkt (DE); Josef Schuster, Deining (DE); Heidi Hummel, Amberg (DE)

(73) Assignee: J. S. Staedtler GmbH & Co., Nürnberg (DE)

( * ) Notice: Subject to any disclaimer, the term of this patent is extended or adjusted under 35 U.S.C. 154(b) by 0 days.

(21) Appl. No.: 10/328,635

(22) Filed: Dec. 24, 2002

(65) Prior Publication Data

US 2003/0131758 A1 Jul. 17, 2003

(30) Foreign Application Priority Data

Jan. 15, 2002 (DE) .......................... 102 01 946

(51) Int. Cl.$^7$ .............................................. C08L 91/08
(52) U.S. Cl. ......................................................... 106/272
(58) Field of Search .......................................... 106/272

(56) References Cited

U.S. PATENT DOCUMENTS 3,607,332 A    9/1971  Wingfield
4,229,546 A  * 10/1980  Swan, Jr. .................... 36/117.6
4,336,071 A  *  6/1982  Schnorrer .................. 106/198.1
4,426,230 A  *  1/1984  Davis et al. .................. 106/272

FOREIGN PATENT DOCUMENTS

DE          4008980         9/1991
DE       297 20 344 U1      4/1998

OTHER PUBLICATIONS

Warth, The Chemistry and Technology of Waxes, pp 437–438, Reinhold Publishing Corporation, NY, Jul. 1956.*

* cited by examiner

*Primary Examiner*—David Brunsman
(74) *Attorney, Agent, or Firm*—Friedrich Kueffner

(57) ABSTRACT

A modeling composition consisting of a wax-based and oil-based binder, a filler, and a coloring agent, wherein the filler is substantially a light filler comprised of hollow microbeads. The binder is comprised of solid wax, pasty wax, and a liquid component of a wax base, an oil base, or a wax and oil base. The binder is present in the modeling composition in an amount of 45 to 90% by weight. The modeling composition can be used as play dough for children or as a therapeutic composition in the medical field for training and rehabilitation.

5 Claims, No Drawings

MODELING COMPOSITION AND ITS USE

BACKGROUND OF THE INVENTION

1. Field of the Invention

The invention relates to a plastic modeling composition for producing molds, models or articles, as well as its use as a play dough for children.

2. Description of the Related Art

Plastically formable compositions for molding and modeling are known in principle.

For example, German patent document 297 20 344 U1 and U.S. Pat. No. 3,607,332 describe industrial plastically formable compositions which are used for producing design models in the automobile industry. The light modeling compositions described therein are comprised of minerals, binders, light fillers, and color-imparting agents and can be processed at temperatures above 50° C., for example, by extrusion or other forming processes; after cooling to room temperature they have a final hardness similar to candle wax. The lower the temperature drops, the more rigid and harder the model formed of this composition becomes. The thus produced shape-stable models or preformed articles can be milled on CNC machine tools or can be manually processed with scraping tools. A disadvantage is that these compositions used in industrial applications have no final aggregate state and cannot be kneaded and/or molded at usual room temperature and are therefore not suitable as play dough for children.

Moreover, the German patent document 40 08 980 C2 describes plastically formable compositions for kneading, modeling, crafting purposes, and decorating. In addition to organic plasticizers and other fillers, these compositions also contain binders, fillers and/or as an additional additive polyalkylmethacrylate (PAMA), in particular, polymethylmethacrylate (PMMA), polyethylmethacrylate (PEMA), polypropylmethacrylate (PPMA) or polybutylmethacrylate (PBMA). The disadvantage of such play dough compositions is that they contain organic plasticizers whose use in the case of play dough for children and sensitive people is to be avoided. Moreover, it is a disadvantage that such compositions can be kneaded at room temperature but also harden irreversibly at room temperature and can no longer be worked by children's hands.

SUMMARY OF THE INVENTION

It is an object of the present invention to provide a composition for crafting purposes, modeling, and shaping of articles which does not have the aforementioned disadvantages and which, in particular, can be kneaded and processed well and with ease at room temperature and which, under normal conditions, stays permanently elastic and does not harden or cure.

It is a further object of the invention that the play dough according to the invention is designed primarily for the use by children and is to be free of ingredients which are possibly hazardous for humans. Moreover, the composition should not dissolve in water and optionally should also have buoyant properties.

In accordance with the present invention, this is achieved in that the binder is comprised of solid wax, pasty wax, and a liquid component on wax and/or oil basis and in that the contents of binder in the play dough is between 45 and 90% by weight.

This object is furthermore achieved in that the modeling composition is used as a play dough for children and for reshaping and/or producing articles by children.

The special advantages of the compositions according to the invention reside in the easy processability of the play dough with bare hands. The consistency of the play dough at normal ambient temperature is approximately constant, and the play dough does not harden or cure when stored in an open package even over an extended period of time. These properties of the play dough are obtained by the use of select types and amounts of binders on wax and oil basis and with different consistency.

In order to maintain the desired softness of the play dough, a pasty wax component (BM2) and a liquid component in the form of a liquid wax and/or oil component (BM3) are added to the solid wax component (BM1). Preferably, the binder in the play dough according to the invention thus contains at least two groups of waxes of different consistency.

Examples of solid waxes (BM1) are microcrystalline wax, beeswax, carnauba wax, paraffin wax, polyethylene wax, polypropylene wax.

An example of a semi-solid wax (BM2) or mineral fat is vaseline, a semi-solid paraffin wax (soft paraffin wax). A thick-flowing (highly viscous) wax (BM3) is, for example, a thick-flowing paraffin.

As an alternative to the thick-flowing wax, white oil (BM3) and/or vegetable oil (BM3), for example, olive oil, can be used.

Optionally, other additives can be added to the binder (BM), for example, minimal amounts of surfactants, glycols, solvents, preservatives and other substances.

The fillers (FS) are substantially so-called light fillers (FSL). These are hollow microbeads of glass or of water-resistant plastic materials. In order to obtain special effects, such hollow microbeads can be provided with surface coatings or also with special fillings.

Depending on the contents of such hollow microbeads, a desired density can be adjusted. The density can be, advantageously, within the range of 0.3 to 1.1 g/ml. Moreover, the size of the commercially available hollow beads can be selected freely. The size of the hollow microbeads is preferably in the range of 10 to 400 $\mu$m.

Moreover, the total mixture, in addition to the aforementioned light fillers (FSL), can also contain auxiliary or secondary fillers (FS2) such as kaolin, chalk, talcum, metal glitter, glitter powder, and glitter flakes or mixtures of these materials in order to provide in this way, for example, special optical or visual effects.

The contents of these auxiliary fillers (FS2) however should not surpass 10% by weight of the total weight of the composition so that the "lightness" as a result of the reduced density of the product is not lost and the designed articles remain buoyant in bathtub water, for example. In this way, modeling compositions can be provided which do not contain kaolin, talcum, and/or zinc stearate as auxiliary fillers (FS2).

The coloring agents (FM) can be pigments in their pure form, e.g., powder pigments or aqueous pigment preparations. As examples of a plurality of possible pigments the following are mentioned: Pigment Yellow 1 (C.I. 11680), Pigment Red 112 (C.I. 12370) and Pigment Blue 15 (C.I. 74160). The addition of these pigments provides the play dough with a brilliant appearance.

As an alternative to the pigments, it is possible to employ lake food colors. Examples of lake food colors are: lake of chinolin yellow E104, lake of indigotin E 132, and lake of Ponceau 4R E124. It must be taken into account that the contents of coloring agents preferably should not surpass a contents of 10% by weight of the total mixture (total weight). In this range, the consistency is not changed or only slightly changed by the addition of coloring agents (FM).

Differently colored play doughs can also be mixed with one another so that a marbled effect can be obtained. Expediently, the employed coloring agents (FM) should no longer be water-soluble within the play dough itself.

DESCRIPTION OF THE PREFERRED EMBODIMENTS

The invention will be explained in the following with the aid of basic formulations as well as specific recipes.

| Basic formulation 1; total mixture (composition) of the play dough | |
|---|---|
| 45–90% by weight | binder (BM) |
| 0–10% by weight | coloring agent (FM) |
| 15–40% by weight | light filler (FSL) |
| 0–20% by weight | auxiliary fillers (FS2) |
| 0–5% by weight | auxiliary additives (ZS) |
| Basic formulation 2; mixture (ratio) of binder components (BM) | |
| 25–85% by weight | solid wax (BM1) |
| 10–25% by weight | pasty wax (BM2) |
| 4–15% by weight | liquid wax and/or oil (BM3) |
| Basic formulation 3; composition of the binder (BM) | |
| 20–60% by weight | microcrystalline wax (BM1) |
| 5–25% by weight | paraffin wax (BM1) |
| 10–25% by weight | vaseline (BM2) |
| 4–15% by weight | white oil (BM3) |
| Recipe 1 - yellow play dough | |
| microcrystalline wax (BM1) | 39% by weight |
| paraffin wax (BM1) | 14% by weight |
| vaseline (BM2) | 15% by weight |
| white oil (BM3) | 7% by weight |
| hollow microbeads (FSL) | 24% by weight |
| Pigment Yellow 1 (FM) | 1% by weight |
| Recipe 2 - red play dough | |
| microcrystalline wax (BM1) | 28% by weight |
| paraffin wax (BM1) | 18% by weight |
| vaseline (BM2) | 18% by weight |
| white oil (BM3) | 9% by weight |
| hollow microbeads (FSL) | 26% by weight |
| Pigment Red 112 (FM) | 1% by weight |
| Recipe 3 - blue play dough | |
| microcrystalline wax (BM1) | 52% by weight |
| paraffin wax (BM1) | 9% by weight |
| vaseline (BM2) | 11% by weight |
| white oil (BM3) | 5% by weight |
| hollow microbeads (FSL) | 22% by weight |
| Pigment Blue 15 (FM) | 1% by weight |
| Recipe 4 - white play dough | |
| microcrystalline wax (BM1) | 39% by weight |
| paraffin wax (BM1) | 14% by weight |
| vaseline (BM2) | 15% by weight |
| white oil (BM3) | 7% by weight |
| hollow microbeads (FSL) | 24% by weight |
| Recipe 5 - combination play dough | |
| microcrystalline wax (BM1) | 36% by weight |
| paraffin wax (BM1) | 14% by weight |
| vaseline (BM2) | 15% by weight |
| white oil (BM3) | 7% by weight |
| hollow microbeads (FSL) | 19% by weight |
| kaolin (FS2) | 8% by weight |
| Pigment Yellow 1 (FM) | 1% by weight |
| Recipe 6 - yellow play dough | |
| microcrystalline wax (BM1) | 55% by weight |
| beeswax (BM1) | 11% by weight |
| vaseline (BM2) | 14% by weight |
| paraffin oil (BM3) | 4% by weight |
| hollow microbeads (FSL) | 16% by weight |
| lake of Chinolin Yellow E104 (FM) | 1% by weight |

The contents of light fillers such as, for example, hollow microbeads (FSL) should preferably not drop below a contents of 15% by weight so that the play dough has a dry feel and a pliable consistency as well as a sufficient shape stability. The shaped articles are soft but stable and, optionally, are buoyant in liquid media such as cold and hot water.

A desirable consistency of the play dough can be achieved without problems by variation of the different binder components relative to one another and their relative proportions.

Depending on the mixture ratios of the binder components, of liquid and pasty components, the properties of the play dough vary.

When the proportion of liquid binders (BM3), such as white oil, is high, an oil film is formed on the hands during kneading. However, when the proportion of pasty components (BM2) is high, and—in an extreme situation—only vaseline is used, the play dough appears very greasy and loses also its shape stability.

The components wax, vaseline, and oil should therefore be present in a balanced proportion, even relative to one another.

The play dough according to the invention is suitable as a result of its minimal density, its warm feel when being handled, and its reshaping capabilities with minimal force expenditure particularly also for therapeutic purposes in the medical field, especially for children but also for adults, in order to train haptic capabilities and, after injuries such as fractures, for rehabilitation purposes.

The modeling composition is well liked by children as play dough for reshaping and/or for producing articles.

While specific embodiments of the invention have been shown and described in detail to illustrate the inventive principles, it will be understood that the invention may be embodied otherwise without departing from such principles.

What is claimed is:

1. A child-safe, play dough comprised of a wax-based and oil-based binder (BM) and a filler (FS), wherein the filler (FS) is substantially a light filler (FSL) comprised of hollow microbeads, wherein the binder (BM) is comprised of solid wax (BM1), pasty wax (BM2), and a liquid component (BM3) of a wax base, an oil base, or a wax an oil base, and wherein the binder (BM) is present in the modeling composition in an amount of 45 to 90% by weight, where the binder (BM) is comprised of:

20–60% by weight of a microcrystalline wax and 5–25% by weight of a paraffin wax as the solid wax (BM1), 10–25% by weight of a mineral fat as the pasty wax (BM2), 4–15% by weight of a white oil as the liquid component (BM3).

2. The play dough according to claim 1, further comprising auxiliary additives (ZS).

3. The play dough according to claim 2, further comprising auxiliary fillers (FS2) an a coloring agent (FM), the modeling composition comprised of:

45–90% by weight of the binder (BM1, BM2, BM3),
0–10% by weight of the coloring agent (FM),
15–40% by weight of the light filler (FSL)
0–20% by weight of the auxiliary fillers (FS2),
0–5% by weight of the auxiliary additives (ZS).

4. The play dough according to claim 1, free of auxiliary fillers in the form of kaolin, talcum, and stearate.

5. The play dough according to claim 1, further comprising a coloring agent (FM) in an amount of 0–10% by weight.

* * * * *